US012812516B2

(12) United States Patent
Soni et al.

(10) Patent No.: US 12,812,516 B2
(45) Date of Patent: Nov. 24, 2026

(54) PREVENTING PATH SWITCH FAILURE BY CONTROLLING RELAY UE BEHAVIOR

(71) Applicant: Nokia Technologies Oy, Espoo (FI)

(72) Inventors: Brajesh Soni, Bangalore (IN); Bharath Ramesh Kashyap, Bangalore (IN); Faranaz Sabouri-Sichani, Aalborg (DK); Ling Yu, Espoo (FI); Vinh Van Phan, Oulu (FI)

(73) Assignee: Nokia Technologies Oy, Espoo (FI)

( * ) Notice: Subject to any disclaimer, the term of this patent is extended or adjusted under 35 U.S.C. 154(b) by 373 days.

(21) Appl. No.: 18/517,771

(22) Filed: Nov. 22, 2023

(65) Prior Publication Data

US 2024/0259923 A1 Aug. 1, 2024

(30) Foreign Application Priority Data

Jan. 27, 2023 (IN) ............................ 202311005447

(51) Int. Cl.
*H04W 36/00* (2009.01)
*H04W 48/16* (2009.01)
*H04W 76/10* (2018.01)

(52) U.S. Cl.
CPC ....... *H04W 48/16* (2013.01); *H04W 36/0079* (2018.08); *H04W 76/10* (2018.02)

(58) Field of Classification Search
CPC .. H04W 48/16; H04W 76/10; H04W 36/0079
See application file for complete search history.

(56) References Cited

U.S. PATENT DOCUMENTS

2012/0106433 A1* 5/2012 Seo ........................ H04W 72/23 370/315
2018/0092017 A1* 3/2018 Freda ................. H04B 7/15528
2021/0315057 A1* 10/2021 Baek ...................... H04W 76/10
2023/0008396 A1* 1/2023 Wang ................ H04W 72/1263
2023/0075762 A1* 3/2023 Xu ........................ H04W 40/36
2024/0031891 A1* 1/2024 Cheng ................. H04W 36/033
(Continued)

FOREIGN PATENT DOCUMENTS

WO 2022/075906 A1 4/2022

OTHER PUBLICATIONS

"3rd Generation Partnership Project; Technical Specification Group Radio Access Network; NR; Radio Resource Control (RRC) protocol specification (Release 17)", 3GPP TS 38.331, V17.2.0, Sep. 2022, pp. 1-1298.
(Continued)

*Primary Examiner* — Allahyar Kasraian
*Assistant Examiner* — Gilbert M. Grant
(74) *Attorney, Agent, or Firm* — Barta Jones, PLLC

(57) ABSTRACT

There is provided a method for a network node, comprising: determining that a remote user equipment (UE) in a cell requires a path switch, the path switch comprising switching the remote UE to connect with the network node via a relay UE; providing, for the remote UE, a connection configuration for connecting with the network node via the relay UE; after providing the connection configuration, determining that the relay UE is to be handed over to another cell; transmitting a message to the relay UE, the message prohibiting the relay UE from establishing a sidelink connection with the remote UE.

10 Claims, 7 Drawing Sheets

(56) References Cited

U.S. PATENT DOCUMENTS

| | | | | |
|---|---|---|---|---|
| 2024/0284299 | A1* | 8/2024 | Chang | H04W 36/36 |
| 2024/0340689 | A1* | 10/2024 | Cheng | H04W 36/08 |
| 2025/0039765 | A1* | 1/2025 | Zhu | H04W 36/32 |
| 2025/0071846 | A1* | 2/2025 | Liu | H04W 76/20 |
| 2025/0184861 | A1* | 6/2025 | Sahyoun | H04W 8/005 |
| 2025/0274955 | A1* | 8/2025 | Cheng | H04W 36/0055 |
| 2025/0301360 | A1* | 9/2025 | Yao | H04W 24/10 |
| 2025/0380193 | A1* | 12/2025 | Wu | H04W 36/0069 |

OTHER PUBLICATIONS

"3rd Generation Partnership Project; Technical Specification Group Radio Access Network; NG-RAN; NG Application Protocol (NGAP) (Release 17)", 3GPP TS 38.413, V17.2.0, Sep. 2022, pp. 1-576.

"3rd Generation Partnership Project; Technical Specification Group Radio Access Network; NG-RAN; Xn application protocol (XnAP) (Release 17)", 3GPP TS 38.423, V17.2.0, Sep. 2022, pp. 1-614.

"Revised WID on NR sidelink relay enhancements", 3GPP TSG RAN Meeting #96, RP-221262, Agenda: 9.3.2.4, LG Electronics, Jun. 6-9, 2022, 6 pages.

European Application No. 22198334.9, "Path Switching", filed on Sep. 28, 2022, pp. 1-30.

"[B105] TP on setup request procedure", 3GPP TSG-RAN WG2 Meeting #118 electronic, R2-2204960, Agenda: 6.7.2.1, Lenovo, May 9-20, 2022, pp. 1-2.

"Inter-gNB path switch to Relay UE in RRC_IDLE or RRC_Inactive", 3GPP TSG-RAN WG2 Meeting #119bis electronic, R2-2209520, Agenda: 8.9.3, MediaTek Inc, Oct. 10-19, 2022, pp. 1-4.

"IEEE 802.11", Wikipedia, Retrieved on Nov. 4, 2023, Webpage available at :IEEE 802.11.

* cited by examiner

PREVENTING PATH SWITCH FAILURE BY CONTROLLING RELAY UE BEHAVIOR

RELATED APPLICATIONS

This application was originally filed as a IN provisional application No. 202311005447 filed on Jan. 27, 2023, which is hereby incorporated in their entirety.

TECHNICAL FIELD

Various example embodiments relate generally to enabling communication with a network via a relay node, such as a mobile relay, and to preventing a path switch failure.

BACKGROUND

It is sometimes beneficial to switch from a direct connection with the network to an indirect connection to the network. The indirect connection may comprise a connection via a relay device. When the relay device is a mobile relay device, such as a user equipment (UE), problems may arise.

BRIEF DESCRIPTION

According to some aspects, there is provided the subject matter of the independent claims. Some further aspects are defined in the dependent claims.

LIST OF THE DRAWINGS

In the following, the invention will be described in greater detail with reference to the embodiments and the accompanying drawings, in which FIG. 1 presents a network, according to an embodiment;

Figure 6:
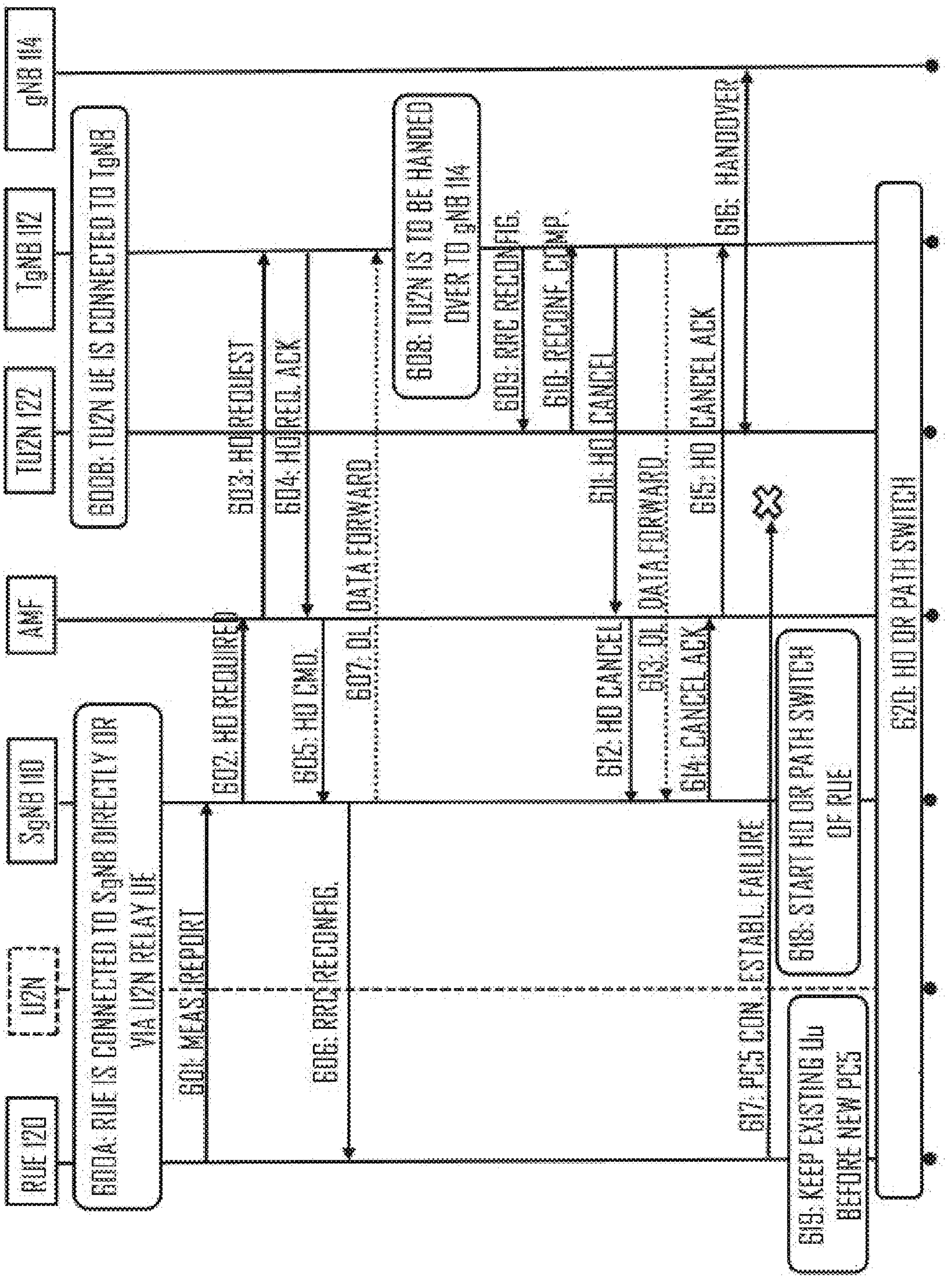
Figure 7:
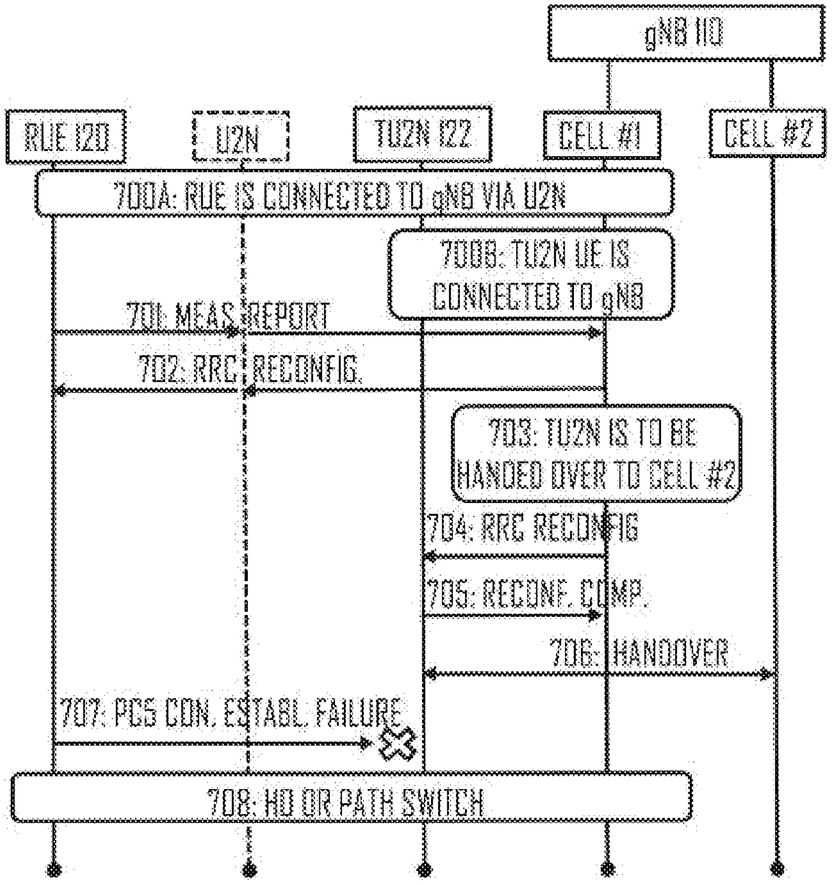
Figure 8:
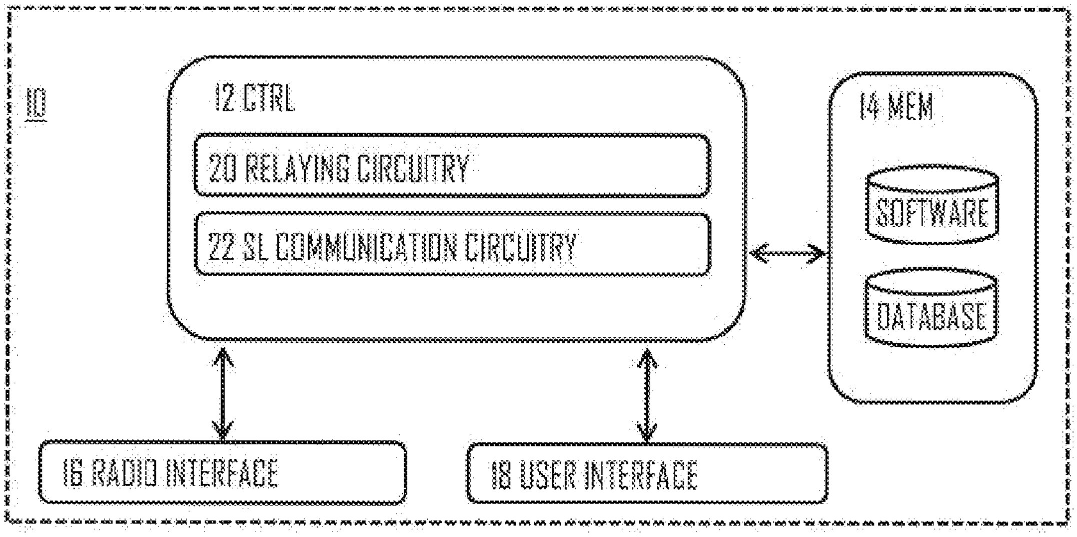
Figure 9:
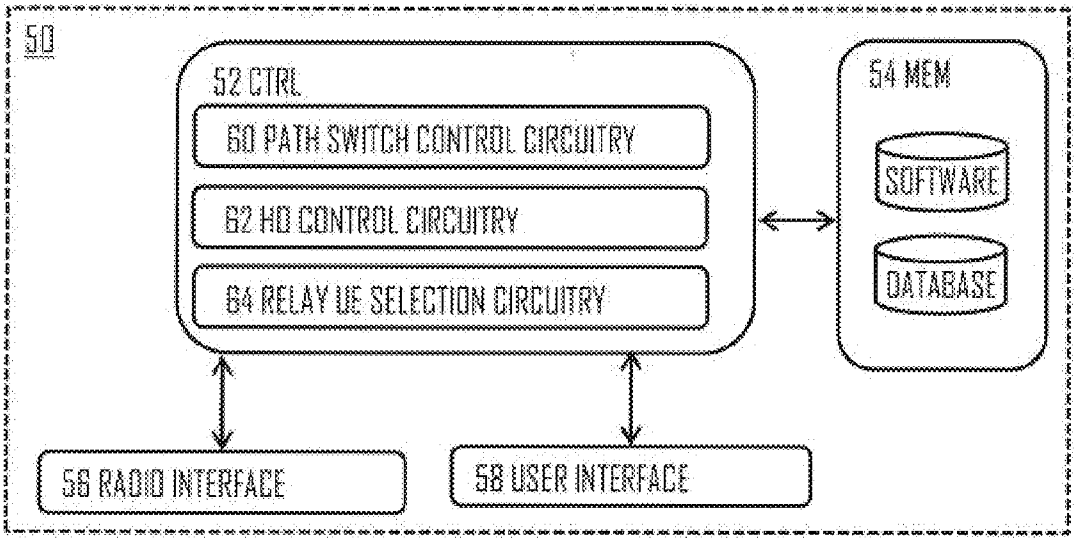

FIGS. 6 and 7 provide signaling flow diagrams, according to some embodiments; and FIGS. 8 and 9 illustrate apparatuses, according to some embodiments.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. For the purposes of the present disclosure, the phrases "at least one of A or B", "at least one of A and B", "A and/or B" means (A), (B), or (A and B). For the purposes of the present disclosure, the phrases "A or B" and "A and/or B" means (A), (B), or (A and B). For the purposes of the present disclosure, the phrase "A, B, and/or C" means (A), (B), (C), (A and B), (A and C), (B and C), or (A, B, and C).

Embodiments described may be implemented in a radio system, such as one comprising at least one of the following radio access technologies (RATs): Worldwide Interoperability for Micro-wave Access (WiMAX), Global System for Mobile communications (GSM, 2G), GSM EDGE radio access Network (GERAN), General Packet Radio Service (GRPS), Universal Mobile Telecommunication System (UMTS, 3G) based on basic wideband-code division multiple access (W-CDMA), high-speed packet access (HSPA), Long Term Evolution (LTE), LTE-Advanced, and enhanced LTE (eLTE). Term 'eLTE' here denotes the LTE evolution that connects to a 5G core. LTE is also known as evolved UMTS terrestrial radio access (EUTRA) or as evolved UMTS terrestrial radio access network (EUTRAN). A term "resource" may refer to radio resources, such as a physical resource block (PRB), a radio frame, a subframe, a time slot, a subband, a frequency region, a sub-carrier, a beam, etc. The term "transmission" and/or "reception" may refer to wirelessly transmitting and/or receiving via a wireless propagation channel on radio resources.

The embodiments are not, however, restricted to the systems/RATs given as an example but a person skilled in the art may apply the solution to other communication systems provided with suitable properties. One example of a suitable communications system is the 5G system. The 3GPP solution to 5G is referred to as New Radio (NR). 5G has been envisaged to use multiple-input-multiple-output (MIMO) multi-antenna transmission techniques, more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology/radio access network (RAT/RAN), each optimized for certain use cases and/or spectrum. 5G mobile communications may have a wider range of use cases and related applications including video streaming, augmented reality, different ways of data sharing and various forms of machine type applications, including vehicular safety, different sensors and real-time control. 5G is expected to have multiple radio interfaces, namely below 6 GHZ, cmWave and mmWave, and being integrable with existing legacy radio access technologies, such as the LTE.

The current architecture in LTE networks is distributed in the radio and centralized in the core network. The low latency applications and services in 5G may require bringing content close to the radio, which leads to local break out and multi-access edge computing. This may provide an ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications). Edge cloud may be brought into RAN by utilizing network function virtualization (NVF) and software defined networking (SDN). Using edge cloud may mean access node operations to be carried out, at least partly, in a server, host or node operationally coupled to a remote radio head or base station comprising radio parts. Network slicing allows multiple virtual networks to be created on top of a common shared physical infrastructure. The virtual networks are then customised to meet the specific needs of applications, services, devices, customers or operators.

In radio communications, node operations may in be carried out, at least partly, in a central/centralized unit, CU, (e.g. server, host or node) operationally coupled to distributed unit, DU, (e.g. a radio head/node). It is also possible that node operations will be distributed among a plurality of servers, nodes or hosts. It should also be understood that the distribution of labour between core network operations and base station operations may vary depending on implementation. Thus, 5G networks architecture may be based on a so-called CU-DU split. One gNB-CU controls several gNB-DUs. The term 'gNB' may correspond in 5G to the eNB in LTE. The gNBs (one or more) may communicate with one or more UEs. The gNB-CU (central node) may control a plurality of spatially separated gNB-DUs, acting at least as transmit/receive (Tx/Rx) nodes. In some embodiments, however, the gNB-DUs (also called DU) may comprise e.g. a radio link control (RLC), medium access control (MAC) layer and a physical (PHY) layer, whereas the gNB-CU (also called a CU) may comprise the layers above RLC layer, such as a packet data convergence protocol (PDCP) layer, a radio resource control (RRC) and an internet protocol (IP) layers. Other functional splits are possible too. It is considered that skilled person is familiar with the OSI model and the functionalities within each layer.

In an embodiment, the server or CU may generate a virtual network through which the server communicates with the radio node. In general, virtual networking may involve a process of combining hardware and software network resources and network functionality into a single, software-based administrative entity, a virtual network. Such virtual network may provide flexible distribution of operations between the server and the radio head/node. In practice, any digital signal processing task may be performed in either the CU or the DU and the boundary where the responsibility is shifted between the CU and the DU may be selected according to implementation.

Some other technology advancements probably to be used are Software-Defined Networking (SDN), Big Data, and all-IP, to mention only a few non-limiting examples. For example, network slicing may be a form of virtual network architecture using the same principles behind software defined networking (SDN) and network functions virtualisation (NFV) in fixed networks. SDN and NFV may deliver greater network flexibility by allowing traditional network architectures to be partitioned into virtual elements that can be linked (also through software). Network slicing allows multiple virtual networks to be created on top of a common shared physical infrastructure. The virtual networks are then customised to meet the specific needs of applications, services, devices, customers or operators.

The plurality of gNBs (access points/nodes), each comprising the CU and one or more DUs, may be connected to each other via the Xn interface over which the gNBs may negotiate. The gNBs may also be connected over next generation (NG) interfaces to a 5G core network (5GC), which may be a 5G equivalent for the core network of LTE. Such 5G CU-DU split architecture may be implemented using cloud/server so that the CU having higher layers locates in the cloud and the DU is closer to or comprises actual radio and antenna unit. There are similar plans ongoing for LTE/LTE-A/eLTE as well. When both eLTE and 5G will use similar architecture in a same cloud hardware (HW), the next step may be to combine software (SW) so that one common SW controls both radio access networks/technologies (RAN/RAT). This may allow then new ways to control radio resources of both RANs. Furthermore, it may be possible to have configurations where the full protocol stack is controlled by the same HW and handled by the same radio unit as the CU.

It should also be understood that the distribution of work between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where servers can be placed between the core and the base station or nodeB (gNB).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future rail-way/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). Each satellite in the mega-constellation may cover several satellite-enabled network entities that create on-ground cells. The on-ground cells may be created through an on-ground relay node or by a gNB located on-ground or in a satellite.

The embodiments may be also applicable to narrow-band (NB) Internet-of-things (IoT) systems which may enable a wide range of devices and services to be connected using cellular telecommunications bands. NB-IoT is a narrowband radio technology designed for the Internet of Things (IoT) and is one of technologies standardized by the 3rd Generation Partnership Project (3GPP). Other 3GPP IoT technologies also suitable to implement the embodiments include machine type communication (MTC) and eMTC (enhanced Machine-Type Communication). NB-IoT focuses specifically on low cost, long battery life, and enabling a large number of connected devices. The NB-IoT technology is deployed "in-band" in spectrum allocated to Long Term Evolution (LTE)—using resource blocks within a normal LTE carrier, or in the unused resource blocks within a LTE carrier's guard-band—or "standalone" for deployments in dedicated spectrum.

The embodiments may be also applicable to device-to-device (D2D), machine-to-machine, peer-to-peer (P2P) communications. The embodiments may be also applicable to vehicle-to-vehicle (V2V), vehicle-to-infrastructure (V2I), infrastructure-to-vehicle (12V), or in general to V2X or X2V communications.

Figure 1:
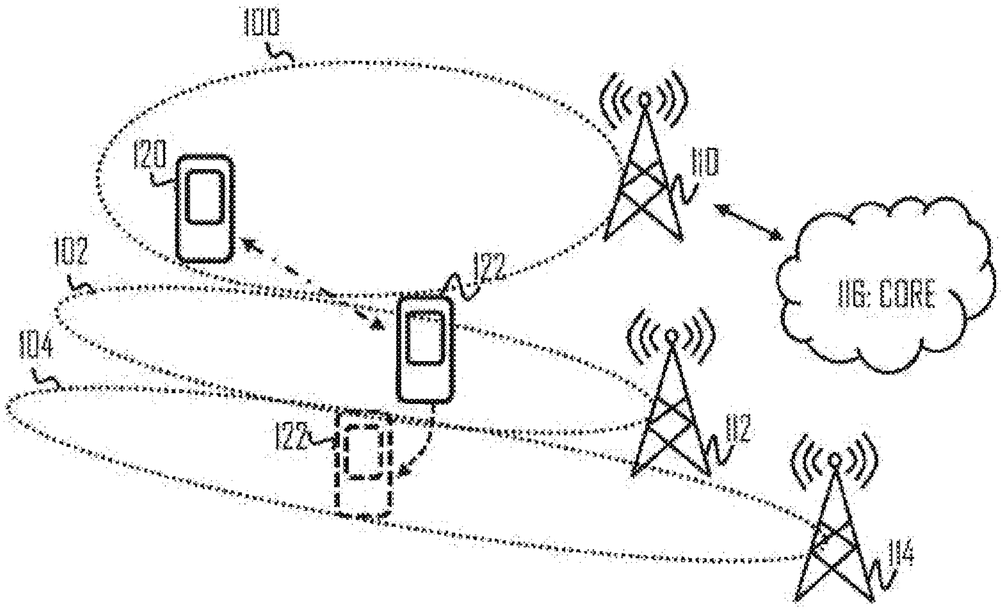

FIG. 1 illustrates an example of a communication system to which embodiments of the invention may be applied. The system may comprise a control node 110 providing one or more cells, such as cell 100, and control nodes 112, 114 providing one or more other cells, such as cells 102 and 104, respectively. Each cell may be, e.g., a macro cell, a micro cell, femto, or a pico cell, for example. In another point of view, the cell may define a coverage area or a service area of the corresponding access node. The control node 110, 112, 114 may be an evolved Node B (eNB) as in the LTE and LTE-A, ng-eNB as in eLTE, gNB of 5G, or any other apparatus capable of controlling radio communication and managing radio resources within a cell. The control node 110, 112, 114 may be called a base station, network node, or an access node.

The system may be a cellular communication system composed of a radio access network of access nodes, each controlling a respective cell or cells. The access node 110 may provide user equipment (UE) 120 (one or more UEs) with wireless access to other networks such as the Internet. The wireless access may comprise downlink (DL) communication from the control node to the UE 120 and uplink (UL) communication from the UE 120 to the control node.

Additionally, although not shown, one or more local area access nodes may be arranged such that a cell provided by the local area access node at least partially overlaps the cell of the access node 110, 112 and/or 114. The local area access node may provide wireless access within a sub-cell. Examples of the sub-cell may include a micro, pico and/or femto cell. Typically, the sub-cell provides a hot spot within a macro cell. The operation of the local area access node may be controlled by an access node under whose control area the sub-cell is provided. In general, the control node for the small cell may be likewise called a base station, network node, or an access node.

There may be a plurality of UEs 120, 122. Each of them may be served by the same or by different control nodes. The UEs 120, 122 may communicate with each other, in case D2D communication interface, known as PC5 connection or a sidelink, is established between them.

The term "terminal device" or "UE" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

In the case of multiple access nodes in the communication network, the access nodes may be connected to each other with an interface. LTE specifications call such an interface as X2 interface. For IEEE 802.11 network (i.e. wireless local area network, WLAN, WiFi), a similar interface may be provided between access points. An interface between an LTE access point and a 5G access point, or between two 5G access points may be called Xn. Other communication methods between the access nodes may also be possible. The access nodes 110, 112, 114 may be further connected via another interface to a core network or networks 116 of the cellular communication system. The LTE specifications specify the core network as an evolved packet core (EPC), and the core network may comprise a mobility management entity (MME) and a gateway node. The MME may handle mobility of terminal devices in a tracking area encompassing a plurality of cells and handle signalling connections between the terminal devices and the core network. The gateway node may handle data routing in the core network and to/from the terminal devices. The 5G specifications specify the core network as a 5G core (5GC), and there the core network may comprise e.g. an access and mobility management function (AMF) and a user plane function/gateway (UPF), to mention only a few. The AMF may handle termination of non-access stratum (NAS) signalling, NAS ciphering & integrity protection, registration management, connection management, mobility management, access authentication and authorization, security context management. The UPF node may support packet routing & forwarding, packet inspection and QoS handling, for example.

NR supports sidelink (SL) based UE-to-Network (U2N) relaying in 3GPP Rel'17 and Rel'18 or beyond. Thus, it is important to support service continuity during path switch/switching of a remote UE using SL based U2N relay (called also a relay UE). Sidelink is a link between two UEs, such as the dot-dashed line in FIG. 1 between UEs 120 and 122. That is, in U2N relay scenario, a remote UE, such as a UE 120, is connected to the network, such as to the control node 112, via a relay UE, such as the UE 122.

There are different scenarios related to U2N relaying. For example, 3GPP Rel'18 NR SL Relay enhancement includes an objective to enhance service continuity for single-hop L2 UE-to-NW relay for the following scenarios:

A. Inter-gNB indirect-to-direct path switching (i.e., "remote UE<->relay UE A<->gNB X" to "remote UE<->gNB Y")
B. Inter-gNB direct-to-indirect path switching (i.e., "remote UE<->gNB X" to "remote UE<->relay UE A<->gNB Y")
C. Intra-gNB indirect-to-indirect path switching (i.e., "remote UE<->relay UE A<->gNB X" to "remote UE<->relay UE B<->gNB X")
D. Inter-gNB indirect-to-indirect path switching (i.e., "remote UE<->relay UE A<->gNB X" to "remote UE<->relay UE B<->gNB Y")

Rel'17 procedures for intra-gNB direct to indirect path switching are used as a baseline for inter-gNB direct to indirect path switching with addition of necessary inter-gNB signaling over Xn interface.

Figure 2:
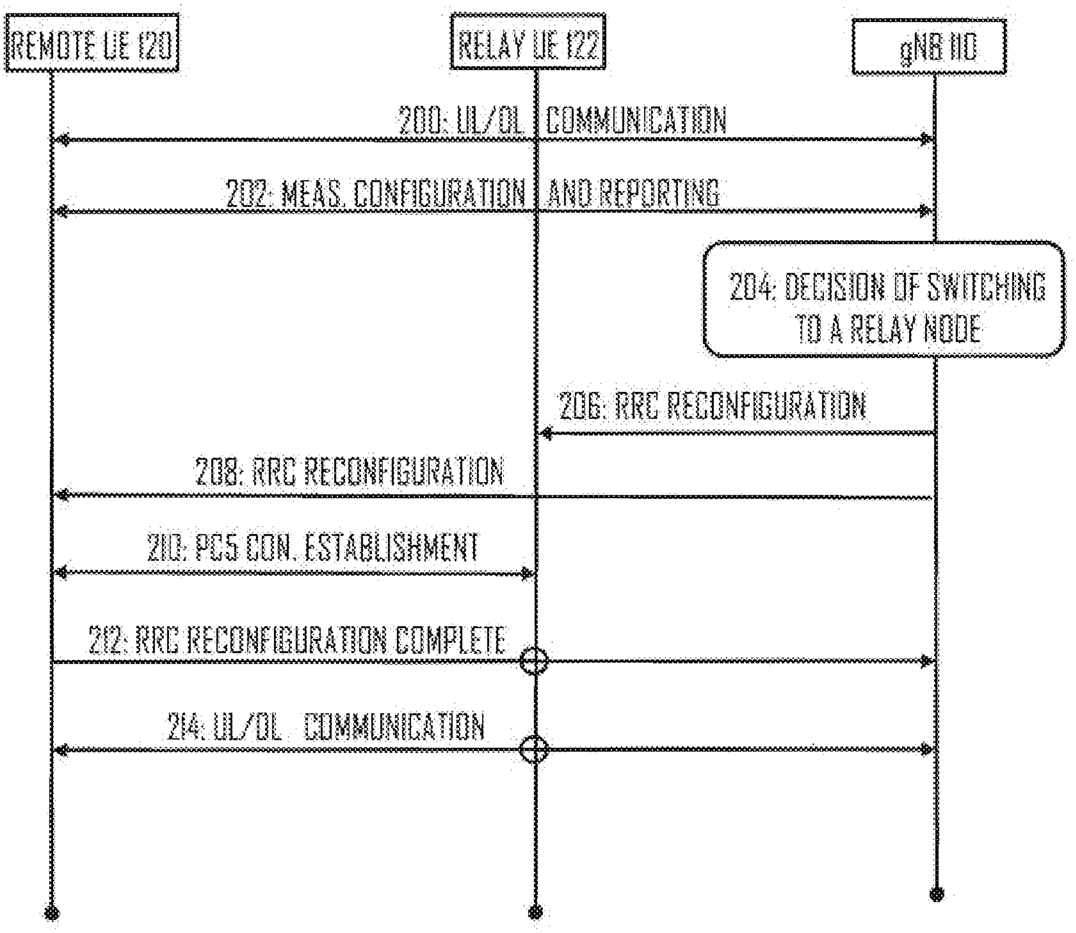
FIG. 2 shows an example of a patch switch procedure.

An example procedure for the remote UE switching to an indirect path via a relay UE from a direct path within the same gNB for 3GPP Rel'17 is shown in FIG. 2. In step 200, the remote UE 120 communicates with the network, such as with the gNB 110. In step 202, the remote UE 120 reports one or multiple candidate Relay UE(s) 122 and possibly measurements of a direct path from remote UE to network (Uu link). The remote UE 120 may have measured and/or discovered one or more candidate relay UE(s) 122. For example, the remote UE 120 may filter appropriate relay UE(s) 122 according to relay selection criteria before reporting. The remote UE 120 shall report only those relay UE candidate(s) 122 that fulfil predetermined criteria. The reporting of step 202 may include at least relay UE identifier (ID), relay UE's serving cell ID, and sidelink measurement quantity information. The sidelink measurement quantity is in an embodiment SL-RSRP (sidelink reference signal received power).

In step 204, the gNB 110 decides to switch the direct path of U2N remote UE 120 to an indirect path via a target U2N relay UE 122. This may be based on the received measurement report of step 202. The gNB 110 may then send an RRC Reconfiguration message to the target U2N relay UE 122 in step 206 for configuring the target U2N relay UE 122 to relay the remote UE's traffic, wherein the message can include at least one of the following: at least one ID of the remote UE, Uu and PC5 relay channel configuration for relaying, and bearer mapping configuration. PC5 is the interface of sidelink between the UEs.

In step 208, the gNB 110 sends RRC Reconfiguration message (e.g. a path switching command) to the remote UE 120 for configuring the remote UE 120 for the path switching from direct path to indirect path via the target relay UE 122. The contents in the RRCReconfiguration message can include at least one of the following: U2N relay UE ID, PC5 relay channel configuration for relay traffic and the associated end-to-end radio bearer(s). Based on receiving such message, the U2N Remote UE may stop user plane (UP) and control plane (CP) transmission over the direct path (Uu link).

In step 210, the U2N remote UE establishes PC5 connection with target U2N relay UE 122. In step 212, the remote UE 120 completes the path switch procedure by sending the RRCReconfigurationComplete message to the gNB 110 via the relay UE 122, and in step 214, the data path is switched from the direct path (of step 200) to an indirect path between the remote UE 120 and the gNB 110.

It is noted that the relay UE 122 in FIGS. 1 and 2 can be in any RRC state. If the relay UE 122 is in RRC_IDLE or RRC_INACTIVE state, the U2N remote UE 120 establishes the PC5 link with the U2N relay UE 122 upon receiving a path switching command (e.g. in connection of step 208) and sends the RRCReconfigurationComplete message via the U2N relay UE 122, which will trigger the U2N relay UE 122 to enter RRC_CONNECTED state.

Figure 3:
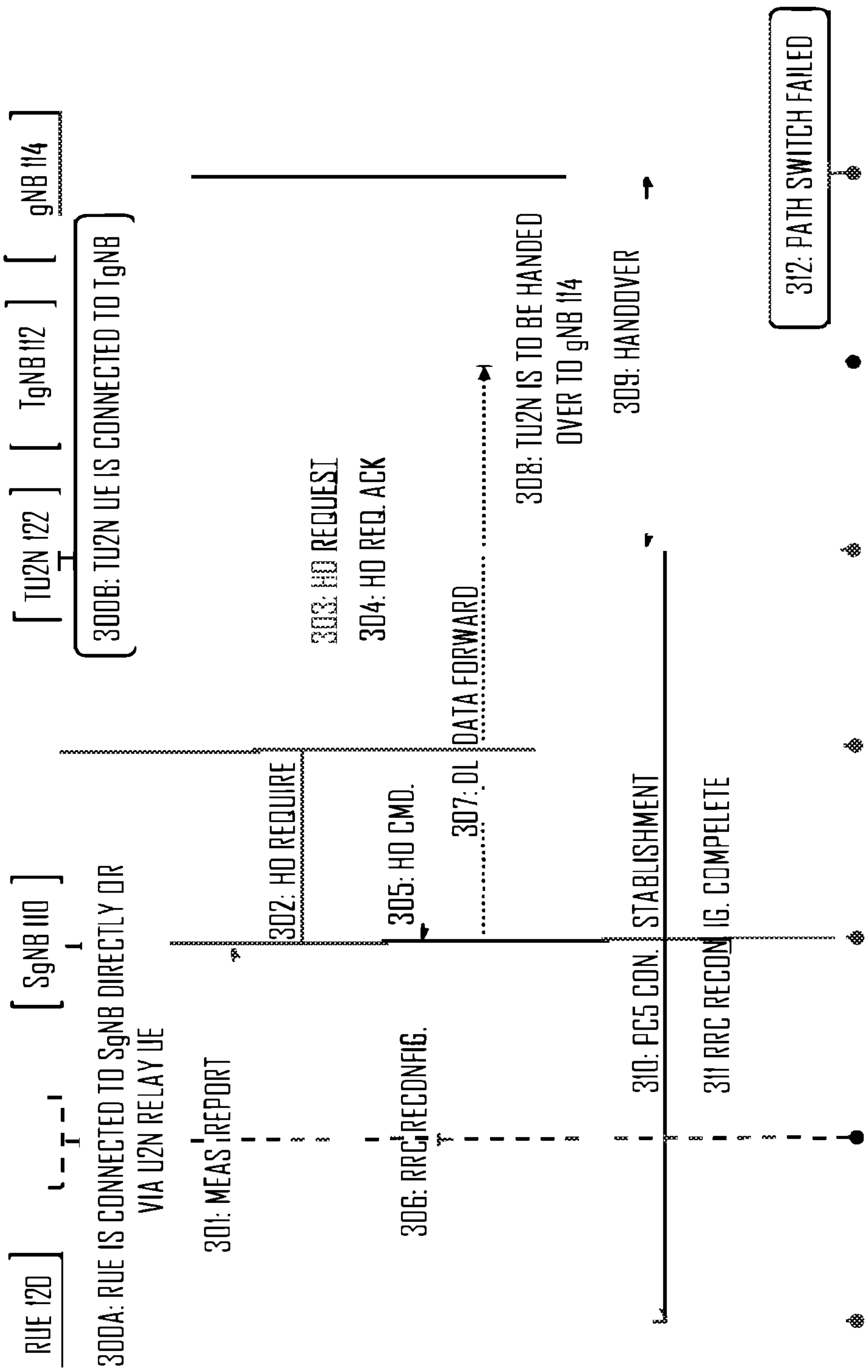
FIG. 3 shows an example of a patch switch failure.

FIG. 3 shows an example of a problem that may occur due to mobility of the relay UE during a path switch. The intention in the scenario of FIG. 3 is to perform a path switch of the remote UE 120 from a direct or an indirect connection with the gNB 110 (cell 100) to an indirect connection with another cell, such as to a cell 102 provided by the gNB 112. Although FIG. 3 shows an inter-gNB direct/indirect to indirect (x2i) situation applicable to scenarios B and D above, similar problem may occur for scenario C when the relay UE moves to another cell provided by the same gNB. This may be because the security and other context could differ in the other cell.

FIG. 3 (and FIG. 6) uses the following abbreviations:

- RUE—Remote UE 120 which is connected to a source gNB 110 and trying to connect to a gNB 112 via a U2N Relay 122.
- U2N relay (UE to Network relay)—A UE that enables the RUE 120 to connect to the source gNB 110 using the PC5 connection. This is not required for scenario B, while is present in scenario D.
- SgNB—Serving gNB 110 of the RUE 120 (directly or via a U2N)
- AMF—Providing AMF services to SgNB 110 as well as to TgNB 112. It is noted that the gNBs 110, 112 may have different AMFs.
- TU2N relay (target U2N relay)—This is the relay UE 122 to which the RUE 120 should connect during the path switch procedure.
- TgNB (Target gNB)—This is the gNB 112 to which the relay UE 122 is originally connected to.
- gNB—This is the gNB 114 to which the relay UE 122 is being handed over by the target gNB 112.

As shown in FIG. 3, when a remote UE 120 is switching its path from an existing direct or indirect path to a (new) indirect path in another cell, the target U2N relay UE's 122 mobility should be considered. In a case where the target U2N relay UE's 122 mobility has triggered a handover of the relay UE 122 to a new cell (in this example provided by the target gNB 114) in between the path switch procedure of the remote UE 120 (i.e., after the remote UE's 120 path switch is started but before it is completed), the U2N relay UE's 122 HO execution may lead to a failure of the ongoing path switch of the remote UE 120. This is demonstrated in FIG. 3 as follows.

In step 300A the remote UE 120 is connected to the serving gNB 110 either indirectly via U2N (i.e. via PC5 and Uu) or directly via Uu connection. Step 300B shows that the relay UE 122 is currently connected to the target gNB 112. It is assumed that the relay UE 122 is in RRC connected mode.

In step 301 the remote UE 120 provides a measurement report to the serving gNB 110. This may indicate to the serving gNB 110 (which in these scenarios B and D may be called a source gNB) signals levels that the remote UE 120 is experiencing towards the serving gNB 110 and towards the target gNB 112, for example. The report may indicate to the serving gNB 110 any potential relay UEs that the remote UE 120 may use for indirect connection establishment with the target gNB 112. These may be based on sidelink discovery messages, for example.

In step 302 the SgNB 110 sends a HO required of the remote UE 110 to the AMF, which the AMF forwards to the TgNB 112 in step 303 in a form of HO request. It has been agreed in 3GPP that HO procedure will be reused as baseline for inter-gNB path switching. This is the reason why existing HO procedure (including the corresponding signaling messages between gNBs and between gNBs and AMF) are used for path switching. For example, HO required/request may be used when a UE is changing its serving gNB, while path switch required/request are used for changing a path between the UE and its serving gNB. In some cases both actions may happen at substantially the same time. In the example case of FIG. 3, the remote UE is intended to be handed over to a target gNB 112, but also over an indirect path via a target U2N relay UE 122. That is, the remote UE 120 undergoes HO from SgNB 110 to TgNB 112, but also its path is changing from a direct or indirect (over U2N as in FIG. 3) to a target U2N relay 122.

In an embodiment where the SgNB 110 selects the candidate target relay UE(s) 122 this message (HO required/HO request) may carry an indication of at least one target relay UE, such as an indication of the UE 122. The selection of relay UE(s) may be based on radio characteristic measurement reports obtained by the SgNB itself (e.g. by triggering measurements at one or more candidate relay UEs) or from the remote UE 120. These radio characteristics may indicate e.g. RSRP at one or more candidate relay UEs.

After receiving the HO request, the TgNB 112 performs admission control for the remote UE 120, e.g. reserves resources for the RUE 120, and then provides connection configuration message in a handover request ACK message in step 304 to the AMF, which then forwards the message to the SgNB 110 in step 305.

This connection configuration message may also include an indication of at least one relay UE 122 to be used for communication with the TgNB 112 by the remote UE 120. That is, in an embodiment the TgNB 112 selects the candidate target relay UE 122 for the remote UE 120. This selection may be based on knowing the signal levels of the connected potential U2N UEs in the cell 102 provided by the TgNB 112. It may be noted that even when it is the SgNB 110 that selects the relay UE 122, it may happen that the signal quality (or cell edge condition) of the potential relay UE is not known exactly by the TgNB without measurement report triggered from the relay UE 122. Further, the remote UE 120 is typically at cell edge, and thus the relay candidates 122 discoverable by the remote UE 120 are also near the cell edge.

In step 306, the remote UE 120 is provided with a RRC reconfiguration message (e.g. based on the above mentioned connection configuration message from the TgNB 112). After this the remote UE 120 may be able to and allowed to attempt to connect the relay UE 122. Step 307 may comprise DL data forwarding from SgNB 110 to TgNB 112. This may be required due to the envisaged path switch procedure that switches the serving gNB of the remote UE 120 from the gNB 110 to the gNB 112.

However, it may happen that the relay UE 122 is moving away from the cell 102. Consequently, in step 308, the TgNB 112 then decides to handover the relay UE 122 to gNB 114. This may be based on mobility of the relay UE 122 towards the cell 104, as shown in FIG. 1). The handover is executed in step 309.

In step 310, the remote UE 120, that is still under the impression that relay UE 122 may be used as for relaying remote UE's traffic towards the gNB 112 and having received the RRC reconfiguration carrying an indication of the selected relay UE 122, establishes PC-5 link with the relay UE 122, and in step 311 the remote UE 120 transmits an RRC Reconfiguration Complete message to the relay UE 122, which forwards the message to the new serving node gNB 114 of the relay UE. However, the new gNB 114 may not recognize the received RRC reconfiguration complete message, as this RRC reconfiguration is compiled by another gNB for another cell (i.e. for cell 102). This may lead to a path switch failure in step 312. As a consequence, the remote UE 120 may fall back to a legacy re-establishment with the SgNB 110, for example.

It is noted that cell to which the relay UE moves, e.g. the cell 104 of FIG. 1, may in an embodiment be provided by the gNB 112 (and not gNB 114) but because the cell configurations of the cells 102 and 104 may be different, the gNB 112 may be unable to understand the received RRC reconfiguration complete message that is configured in association of cell 102, and not of cell 104.

It is noted that there are different HO procedures defined in 3GPP. These include e.g. a N2 based HO procedure via AMF and a Xn based HO procedure directly between source gNB and target gNB. Although the Figures show AMF (i.e. N2 based HO), the embodiments are applicable to both cases. In other words, the path switching may be performed directly between gNBs 110 and 112 without involvement of the AMF, in the similar way as currently presented in FIGS. 3, 6 and 7.

Thus, as shown with FIGS. 1 and 3, a problem may arise if the relay UE 122 in RRC CONNECTED state undergoes a handover from cell 102 of gNB 112 to cell 104 of gNB 114 (or in general from one cell to another cell) during the path switching preparation phase of the remote UE 120 (e.g. during the time period between TgNB 112 sending the HO request ACK in step 304 and the PC5 connection establishment completed in step 310). This is because the relay UE 122 would then provide the RRC reconfiguration complete message to the gNB 114 instead of the gNB 112 (or in general the RRC reconfiguration complete message is associated with a different cell than in which it was provided). That is, the path switching configuration of the remote UE 120 is provided by the gNB 112 and thus sending the RRC reconfiguration complete message to another gNB 114 may cause a failure of the path switching of the remote UE 120. Such path switch failure may happen especially in high mobility scenario of the relay UE 122. Path switch failure may cause significant delay.

To at least partially tackle these problems, there is proposed a solution for a path switching failure detection to enhance service continuity of the remote UE 120 during path switching. The solution may comprise configuring the relay UE 122, by a serving gNB, to prohibit the PC5 link establishment with the remote UE 120, in case the relay UE 122 has been selected as a target relay UE for a path switching of the remote UE, but then became (due to mobility) an invalid target relay UE during path switching execution of the remote UE 120. In addition, the U2N relay UE 122 may be configured to indicate the prohibition to the remote UE 120, either in PC5 connection rejection upon receiving PC5 connection establishment request from the remote UE 120 or proactively before receiving PC5 connection establishment request from the remote UE 120. This may allow the remote UE 120 to initiate, e.g., a connection reestablishment with the serving gNB and thus early prevention of path switch failure. The solution may also comprise the serving gNB of the relay UE 122 to inform the serving gNB of the remote UE 120 about the cancellation of on-going path switch of the remote UE 120, at least in case of inter-gNB path switching, so that the source gNB of the remote UE 120 can evaluate a next path switch-option prior to occurrence of a path switch failure.

Figure 4A:
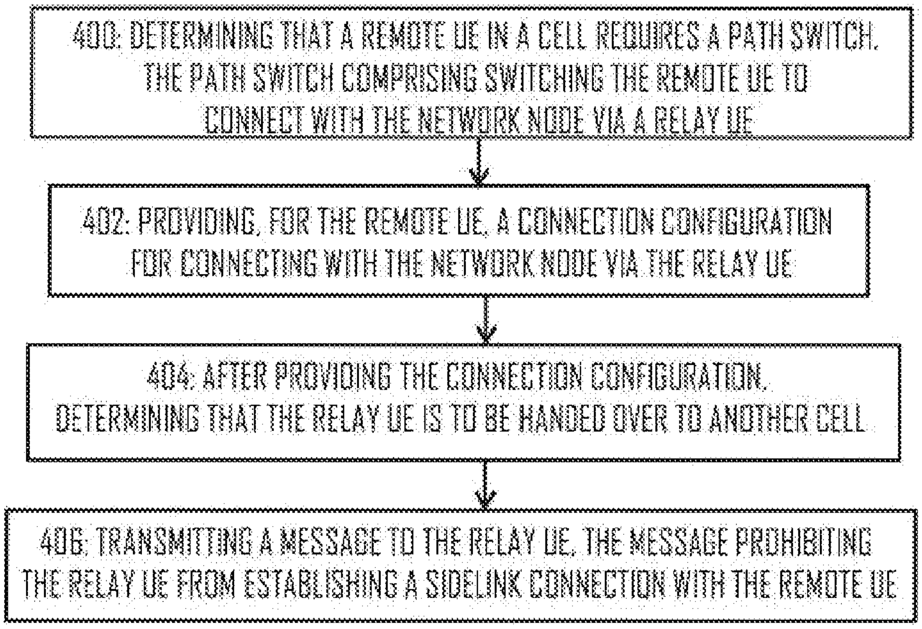
FIGS. 4A and 4B show methods, according to some embodiments.

FIG. 4A depicts an example method. The method may be computer-implemented. The method may be performed by an access node, such as the gNB 112 or the gNB 110. Although some of the embodiments are described from the point of view of the gNB 112, and thus covering scenarios B and D above, the embodiments are applicable also to scenario C where the remote UE and the relay UE are both initially in the same cell provided by e.g. gNB 110 of FIG. 1. Thus, the steps of FIG. 4A can be performed by the gNB 112 or the gNB 110. In the following term "gNB 110/112" means either of gNB 110 or gNB 112 may perform the task, depending on the scenario.

In step 400, the gNB 110/112 determines that a remote UE 120 in a cell 100 requires a path switch, the path switch comprising switching the remote UE to connect to the gNB 110/112 via a relay UE 122 (in same or different cell). This determination may be triggered based on measurements reports of the remote UE 120 or based on an indication (e.g. a path switch request) from a source gNB 110 of the remote UE 120 or from the AMF, for example.

In an embodiment, the path switch comprises switching a connection of the remote UE 120 from another indirect connection with the gNB 110 in cell 100 to an indirect connection with the gNB 110 via the relay UE 122 in the same cell 100. In other words, this embodiment represents the path switch for scenario C discussed above.

Figure 5A:
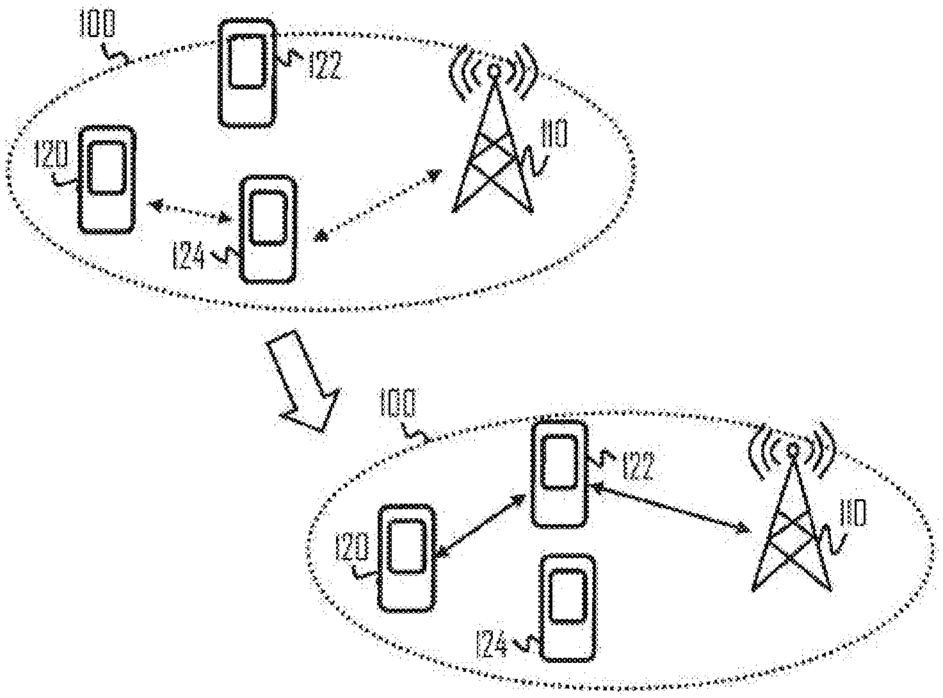
FIGS. 5A and 5B illustrate path switching procedures, according to some embodiments.

This scenario C is shown in FIG. 5A where the remote UE 120 is originally indirectly connected with the gNB 110 via another relay UE 124 (represented with dotted arrows in FIG. 5A). Based on the path switching, the remote UE 120 would try to connect with the gNB 110 via the relay UE 122 (represented with solid arrows).

In another embodiment, the path switch comprises switching a connection of the remote UE 120 in cell 100 from a direct connection with a serving network node 110 to an indirect connection with the target gNB 112 via the relay UE 122 in cell 102. This represents scenario B discussed above.

In yet one embodiment, the path switch comprises switching a connection of the remote UE 120 from an indirect connection with the serving network node 110 in cell 100 to an indirect connection with the gNB 112 via the relay UE 122 in cell 102. This represents scenario D discussed above.

Figure 5B:
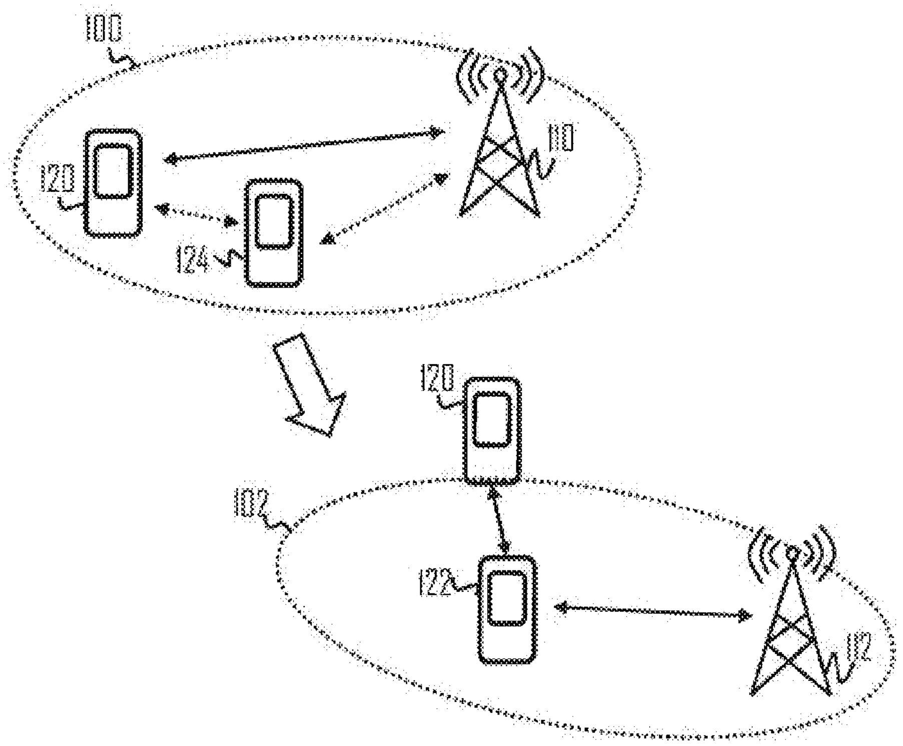

Scenarios B and D are shown in FIG. 5B where the remote UE 120 is originally either directly connected with the gNB 110 (represented with solid arrow), or indirectly connected with the gNB 110 via the relay UE 124 (represented with dotted arrows). Based on the path switching, the remote UE 120 would try to connect with the gNB 112 via the relay UE 122.

In step 402 of FIG. 4A, the gNB 110/112 provides, for the remote UE 120, connection configuration for connecting with the gNB 110/112 via the relay UE 122. This may be provided to the remote UE 120 in a form of RRC reconfiguration message either directly, via the other relay UE 124 and/or via the serving gNB 110, depending on the scenario. Connection configuration may be used by the remote UE 120 to connect with the gNB which transmitted the connection configuration via the relay UE 122. The connection configuration may comprise e.g. security context of the relevant cell and gNB. This connection configuration may comprise necessary sidelink configuration for communicating with the relay UE 122 and Uu configuration for communicating with the gNB 112 via the relay UE 122.

The connection configuration that is received by the remote UE 120 may in an embodiment include an indication of the relay UE 122, e.g. identity of the relay UE. For example, in an embodiment applicable to scenarios B or D, the target gNB 112 may identify and select that relay UE 122 which should be used for remote UE's connection, and then include an indication (e.g. identifier) of the relay UE 122 in the connection configuration. In some other embodiments, the source/serving gNB 110 selects the relay UE 122, possibly based on sidelink measurement results from the remote UE 120, such as a ProSe discovery process between user equipments over sidelink. In such case, the target gNB 112 need not select the relay UE itself. In such cases, the connection configuration may not need to comprise an indication of the relay UE 122.

After step 402, the remote UE 120 may be ready to attempt to perform the patch switch via the relay UE 122. However, in step 404, after providing the connection configuration, the gNB 110/112 determines that the relay UE 122 is to be handed over to another cell than the cell where the relay UE was located at the time of step 400, e.g. when the path switch request was made. The determination of the need for the handover may be based on receiving cell quality measurement reports from the relay UE 122. These measurement reports may indicate e.g. reference signal received power (RSRP) of serving and neighboring cells. Consequently, the gNB 110/112 may trigger the handover of the relay UE 122 to the other cell. This other cell may be e.g. cell 104 in FIG. 1.

This mobility of the relay UE 122 may cause that the UE 122 is no longer associated with the required cell and is no longer a valid relay UE candidate for the remote UE 120. By association it is for example meant that the relay UE is connected to the access node of the cell. As described above with reference to FIG. 3, such mobility might lead to path switch failure. Throughout the description the UE 122 is referred to as "relay UE", as it is the intended relay UE for the remote UE 120, even though due to mobility the UE 122 cannot eventually act as a relay for the remote UE 120.

To avoid wasting time for processes that are likely to result in a path switch failure, the gNB 110/112 transmits a message (e.g. a first message) to the relay UE 122 in step 406, wherein the message prohibits the relay UE 122 from establishing a sidelink connection with the remote UE 120. At this point the relay UE 122 may still be in the cell provided by the gNB 110/112 (i.e. the relay UE has not been handed over to the other cell). That is, the first message may indicate to the relay UE 122 that specific remote UE 120 may be attempting to establish a sidelink connection with the relay UE, and that the relay UE 122 is to reject such connection establishment. Further, the first message may indicate that the relay UE 122 provides in a connection rejection message to the remote UE 120 an indication of what is the reason that the sidelink connection should not be established (i.e. the mobility of the relay UE 122 to another cell).

It is noted that since the remote UE 120 is either indirectly connected with the gNB 110 via another relay 124 or even in a different cell provided by the gNB 110, then informing the remote UE 120 would require at least two hops while informing the relay UE 122 may take place via a direct connection and may thus be faster. Further, the remote UE 120 may be triggered for path switching due to poor condition of the previous connection (either direct or indirect connection) with the gNB 110. Therefore, sending messages/instructions to the remote UE 120 may not be as robust as sending the same to the relay UE 122.

In an embodiment, this first message transmitted in step 406 indicates the identity of the remote UE 120. For example, some identifier identifying the remote UE 120 may be provided in the first message to the relay UE 122. This may allow the relay UE 122 to connect with other UEs via sidelink but preventing sidelink connection establishment with the remote UE 120.

In an embodiment, the first message is included in a handover command for the relay UE 122. This may advantageously limit the among messaging needed to the relay UE 122.

In an embodiment, the gNB 110/112 receives, from the relay UE 122, an acknowledgement for the transmitted first message.

In an embodiment where the steps of FIG. 4A are performed by the gNB 112, which may be called a target gNB, and where the remote UE 120 is served by the gNB 110, which may be called a source gNB, the target gNB 112 may provide a second message for the source gNB 110. The second message may indicate that the remote UE 120 should not attempt to establish the sidelink connection to the relay UE 122. This embodiment may advantageously further contribute to ensure that the remote UE 120 and the relay UE 122 shall not establish the sidelink connection. However, as explained above, in some cases this message may reach the remote UE 120 too late (i.e. after sidelink connection establishment attempt), and for those cases it is advantageous that the relay UE 122 is also informed not to accept the connection establishment attempt from the remote UE 120. This is because otherwise the relay UE 122 might accept the connection establishment from the remote UE 120 and then further radio resource wasting communication would be transferred over the sidelink connection, such as RRC reconfiguration complete message 311 of FIG. 3 that would not be understood or accepted eventually by the gNB of the cell to which the relay UE 122 has moved in the meantime (such as the cell provided by the gNB 114 of FIG. 3).

In an embodiment, this second message to the source gNB 110 indicates cancellation of the path switch. As a response to receiving this second message, the SgNB 110 may e.g. take-back the remote UE 120 in case the remote UE 120 happens to move into direct coverage or indirect coverage of the SgNB 110. It is noted that the SgNB 110 may after receiving the second message anticipate that remote UE 120 may try to keep the connection or re-connect with SgNB 110 (as PC5 link with target U2N 122 is expected to fail). As another response to receiving this second message, the SgNB 110 may attempt to perform a new HO for the remote UE 120 to a different target gNB if available (in case the second message carries information of e.g. the gNB 114 to which the relay UE 122 is moving) or to the same target gNB 112 via a different relay UE if available. As yet one response to receiving this second message, the SgNB 110 may release the remote UE 120.

In an embodiment the second message further indicates that a cause of the path switch cancellation is mobility of the relay UE 122. Knowledge of the cause may help the SgNB 110 to avoid future selection of UEs, that have similar radio characteristics, as candidates for relay UEs, for example.

In an embodiment, the target gNB 112 includes in the second message an indication of another relay UE via which the remote UE can connect to the gNB 112. This may expedite the processes after cancellation of the current path switch attempt, because the source gNB 110 may inform to the remote UE 120 that there is another relay UE which may be used for sidelink connection establishment. The target gNB 112 may have selected this other (one or more) candidate relay UE based on signal quality (e.g. RSRP) reports of UEs in the cell provided by the target gNB 112. A further criterion may be that the (one or more) candidate relay UE is not prone to handover, e.g. that the mobility is lower than threshold or the location of the UE is not close to cell-edge.

In an embodiment, the target gNB 112 receives, from the source gNB 110, an acknowledgement for the second message.

Figure 4B:
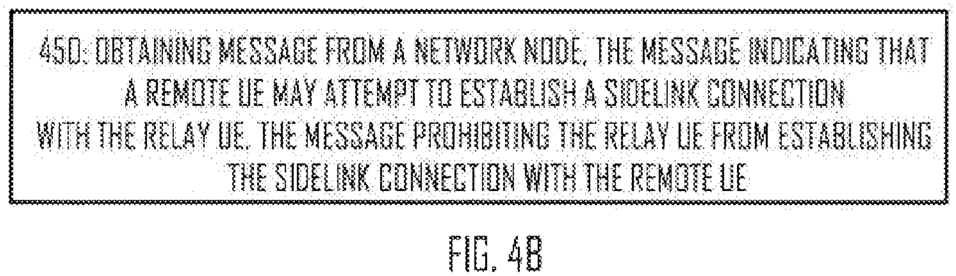

FIG. 4B depicts another example method. The method may be computer-implemented. The method may be performed by a UE, such as the relay UE 122. In step 450, the UE 122 obtains a message from a network node, such as from the gNB 110 or from gNB 112, the message indicating that another UE, such as the remote UE 120, may be attempting to establish a sidelink connection with the relay UE 122. The message indicates to the relay UE 122 to restrain from establishing the sidelink connection with the remote UE 120.

In an embodiment, the relay UE 122 receives an indication from the gNB 110 or from 112 that the UE 122 is to act as a relay UE for the remote UE 120. That is, the relay UE 122 may be informed of a relay UE role based on a received indication, such as a RRC reconfiguration message in which a corresponding configuration for relaying the remote UE's traffic can be configured for the relay UE 122.

Let us then take a closer look at an embodiment applicable to scenarios B and D. FIG. 6 depicts an embodiment, where the remote UE 120 is served by a source network node 110 and the relay UE 122 is in another cell provided by the target gNB 112.

Steps 600-608 of FIG. 6 are the same as steps 300-308 in FIG. 3.

After the target gNB 112 has decided in step 608 to handover the relay UE 122 to a new cell, which is provided in this example embodiment by the gNB 114, the target gNB 112 in step 609 configures the relay UE 122 to prohibit the establishment of PC5 link between remote UE 120 and the relay UE 122. As an example implementation of this step 609, the target gNB 112 sends RRC Reconfiguration message with SL-RemoteUE-ToProhibit-r17 IE to the relay UE 122. In an embodiment, the target gNB 112 may send an sl-RemoteUE-ToProhibitList-r17 to configure the relay UE 122 to prohibit PC5 link establishment with multiple UEs indicated in the list. Transmission of this first message is possible, as the relay UE 122 is in RRC connected state and the target gNB 112 knows the location of the relay UE and is responsible of the handover of the relay UE 122. If the relay UE 122 was in RRC idle or inactive mode, the gNB 112 might be unaware of the location of the relay UE 122.

In step 610 the relay UE 122 confirms (acknowledges) the PC5 link prohibition instruction. As an example, the relay UE 122 sends an RRC Reconfiguration Complete message with SL-RemoteUE-ToProhibited-r17 to the target gNB 112. In an embodiment, the relay UE 122 can acknowledge the prohibition of PC5 link for multiple remote UEs with sl-RemoteUE-ProhibitedList-r17.

In step 611, the target gNB 112 may cancel the ongoing path switch by sending e.g. NGAP:HandoverCancel towards the source gNB 110. This represents the second message mentioned above. In an embodiment, the second message may carry an indication of the cause of the path switch cancellation, which is this case may be the mobility of the relay UE 122. The second message may be sent to the AMF.

In yet one embodiment, the target gNB 112 may include information of at least one other candidate relay UE ID in the second message. For example, the target gNB 112 may have identified more than one relay UEs applicable for the remote UE 120, or the target gNB 112 has received more than one relay UE IDs in the handover request of step 603. The information of each candidate relay UE may include e.g. an identifier (ID) associated with the at least one candidate relay UE. This may expedite over all path switch procedure with next potential target relay UE.

In step 612, the AMF may cancel the on-going path switch and inform the same to the SgNB 110, possibly by using NGAP:HandoverCancel with a cause of U2N mobility. The SgNB 110 may acknowledge the reception of the HO cancel message in step 614, and the AMF may transmit acknowledgment to the target gNB 112 in step 615. It is noted, as said above, that the proposed solution is applicable to both Xn and Ng (e.g. N2) based path switching. Therefore, the messages involved in steps 609 to 615 may vary.

Step 613 may comprise DL data forward from target gNB 112 to the SgNB 110, if needed.

In step 616, the relay UE 122 may perform handover to the gNB 114, or any time after step 610.

Assuming the remote UE 120 in step 617 attempts to establish the sidelink connection (e.g. if the remote UE 120 has not received an indication of path switch cancellation), then step 617 comprises in this example a PC5 link establishment failure, due to the relay UE 122 not accepting the establishment.

In an embodiment, after receiving a connection establishment attempt from the remote UE 120, the relay UE 122 may reject the connection establishment attempt, as instructed to do so by the message of step 609. In an embodiment, the relay UE 122 may nevertheless inform the remote UE 120 about a cause of the rejection (e.g. the mobility of the relay UE 122). For example, the relay UE 122 may temporarily establish a sidelink connection to inform the remote UE 120 but then release the sidelink connection.

After the PC5 rejection, if the remote UE 120 has broken Uu interface with the source gNB 110, the remote UE 120 can trigger re-establishment procedure. Otherwise, the remote UE 120 may inform the SgNB 110 about the failure of the PC5 link establishment.

It is noted that order of steps may vary from that shown in FIG. 6 and e.g. step 617 may be performed by the remote UE 120 any time after step 606.

Step 618 may comprise the source gNB 110, after receiving the path switch cancellation indication in step 612 or after receiving the indication of failure of the PC5 link establishment from the remote UE 120, preparing or triggering a new HO/path switch preparation with next potential target relay UE. This may comprise the SgNB 110 informing the remote UE 120 not to attempt to establish connection with the relay UE 122, but possibly with some other potential or selected relay UE.

In step 619, if the remote UE 120 supports, the remote UE 120 may apply a "make before break" principle, according to which the remote UE 120 does not break the existing Uu connection with the SgNB 110 prior to PC5 link establishment with a relay UE.

In step 620, a new patch switch procedure may be performed, possibly based on step 618. That is, based on potential target (direct or indirect via a new relay), the SgNB 110 and the remote UE 120 may perform HO/path switch procedure, respectively.

It is noted that the order of the steps may vary and e.g. the RRC messaging exchange between the target gNB 112 and the relay UE 122 in steps 609-610 (and the related handover in step 616) may be performed already any time after step 604. Performing the handover comprises transmission of a handover command message (e.g. RRC reconfiguration message in step 609) from the target gNB 112 to the relay UE 122 as well as handover procedure between the relay UE 122 and the gNB 114 in step 616. In an embodiment, the RRC Reconfiguration comprising the IE "SL-RemoteUE-ToProhibit-r17" may be comprised in such a handover command message.

In an embodiment, in case the PC5 link was already established between the relay UE and the remote UE at the time of the relay UE 122 receiving the handover command from the target gNB 112, then the relay UE 122 may e.g. drop the RRC Reconfiguration Complete message that is received from the remote UE 120. As a further action, the relay UE 122 may send a notification to the remote UE 120, e.g. a Notification MessageSidelink (indication Type-r17: PathSwitchCancellation). After that, the remote UE 120 may trigger a re-establishment with the SgNB 110, for example. The remote UE 120 may then also inform the SgNB 110 about the failure to execute the path switch procedure.

As shown in FIG. 6, there are at least two solutions for avoiding wasting time and resource for path switch failure by preventing the remote UE to send RRC reconfiguration complete to the gNB 114 (who is not intended to receive such). These solutions may be employed either separately or together. These solutions comprise e.g. instructing the relay UE 122 not to accept sidelink connection establishment with the remote UE 120 and/or instructing the remote UE 120 not to attempt the PC5 link establishment. A successful prohibition of PC5 link establishment between the relay UE and the remote UE may enable the gNB 112 to cancel on going path switch without wasting too much time and resources. It is also possible to enable the SgNB 110 to prepare and execute a HO (i.e. hand the remote UE 120 to another cell) or to perform a path switch of remote UE 120 with a next potential target.

FIG. 7 shows another example applicable to scenario C, where the remote UE 120 and the relay UE 122 are initially in the same cell #1 provided by the gNB 110, as shown with steps 700A and 700B. Figure shows that the remote UE 120 is connected indirectly via a U2N (marked with dashed line) with the gNB 110. However, in an embodiment, the remote UE 120 is originally connected directly with the gNB 110.

In step 701, the remote UE 120 sends a measurement report to the gNB 110. This may indicate to the gNB 110 signals levels the remote UE 120 is experiencing towards the current relay UE, for example. The report may indicate to the gNB 110 any other potential relay UE(s) 122 that the remote UE 120 may, instead of the current relay UE, use for indirect connection establishment with the gNB 110. These may be based on ProSe discovery, for example.

In step 702, the gNB 110 may trigger a path switch of the remote UE 120 by sending a RRC reconfiguration message to the remote UE 120. This connection configuration may instruct the remote UE 120 to establish sidelink connection with the relay UE 122. The remote UE 120 may response by acknowledgement.

In step 703, the gNB 110 determines that the relay UE 122 in RRC connected state needs to be handed over to another cell #2, which is in this example embodiment also provided by the gNB 110, but which has different cell configuration than cell #1. Thus, the gNB 110 may not be able to understand any RRC reconfiguration complete messages from the remote UE 120 via the relay UE in cell #2, as the corresponding RRC reconfiguration is associated with cell #1. Alternatively, cell #2 can be provided by another gNB.

In step 704, the gNB 110 transmits to the relay UE 122, before the relay UE is handed over to the cell #2, the first message (e.g. RRC reconfiguration message) instructing the relay UE not to accept sidelink connection establishment from the remote UE 120. The relay UE 122 may acknowledge this instruction in step 705. In an embodiment the first message may be embedded in a handover command. In step 706, the relay UE 122 may be handed over to the other cell #2.

In step 707, the relay UE 122 receives a sidelink connection establishment from the remote UE 120 but rejects it. As a consequence, the remote UE 120 may in step 708 fall back to e.g. handover to another cell or to path switch procedure via another relay UE.

FIG. 7 may in some embodiments be enhanced with the second message from the gNB 110, via the current U2N, to the remote UE 120, wherein the second message cancels the path switch and instructs the remote UE 120 not to attempt connection establishment with the relay UE 122. However, for simplicity, these messages are not shown in FIG. 7.

Possible implementation to standard specifications may include e.g. the following:

```
In TS 38.331:
RRCReconfiguration-v1700-IEs ::=
SL-L2RelayUE-Config-r17::={
sl-RemoteUE-ToProhibitList-r17 SEQUENCE (SIZE
(1..maxNrofRemoteUE-r17)) OF SL-RemoteUE-ToProhibit-r17
OPTIONAL,
}
RRCReconfigurationComplete-v1700-IEs ::= SEQUENCE {
sl-RemoteUE-ProhibitedList-r17 SEQUENCE (SIZE
(1..maxNrofRemoteUE-r17)) OF SL-RemoteUE-ToProhibited-17
}
```

-continued

```
SL-RemoteUE-ToProhibit-r17::= {
SL-RemoteUE-ToProhibited BOOLEAN
    }
NotificationMessageSidelink-r17-IEs ::= SEQUENCE {
indicationType-r17 ENUMERATED {
PathSwitchCancellation
}
}
In TS 38.413:
NGAP:HandoverCancel
cause: U2N mobility
direction - AMF --> GNB
NGAP:HandoverCancelACK
direction -GNB -- > AMF
```

An embodiment, as shown in FIG. 8, provides an apparatus 10 comprising a control circuitry (CTRL) 12, such as at least one processor, and at least one memory 14 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 10 may comprise the terminal device of a communication system, e.g. a user terminal (UT), a computer (PC), a laptop, a tabloid computer, a cellular phone, a mobile phone, a communicator, a smart phone, a palm computer, a mobile transportation apparatus (such as a car), a household appliance, or any other communication apparatus, commonly called as UE in the description. Alternatively, the apparatus is comprised in such a terminal device. Further, the apparatus may be or comprise a module (to be attached to the UE) providing connectivity, such as a plug-in unit, an "USB dongle", or any other kind of unit. The unit may be installed either inside the UE or attached to the UE with a connector or even wirelessly.

In an embodiment, the apparatus 10 is or is comprised in the UE 122. The apparatus may be caused to execute some of the functionalities of the above described processes, such as some of the steps of FIGS. 4B, 6 and 7.

The apparatus may further comprise a radio interface (TRX) 16 comprising hardware and/or software for realizing communication connectivity according to one or more communication protocols. The TRX may provide the apparatus with communication capabilities to access the radio access network, for example.

The apparatus may also comprise a user interface 18 comprising, for example, at least one keypad, a microphone, a touch display, a display, a speaker, etc. The user interface may be used to control the apparatus by the user.

The control circuitry 12 may comprise a relaying circuitry 20 for operating as a relay UE for a remote UE. The relaying circuitry may be responsible of relaying data from the remote UE to the network, or from the network to the remote UE. The control circuitry 12 may further comprise a sidelink communication circuitry 22 for communicating on the sidelink, and in some cases rejecting the sidelink establishment according, according to any of the embodiments.

An embodiment, as shown in FIG. 9, provides an apparatus 50 comprising a control circuitry (CTRL) 52, such as at least one processor, and at least one memory 54 storing instructions that, when executed by the at least one processor, cause the apparatus at least to carry out any one of the above-described processes. In an example, the at least one memory and the computer program code (software), are configured, with the at least one processor, to cause the apparatus to carry out any one of the above-described processes. The memory may be implemented using any suitable data storage technology, such as semiconductor-based memory devices, flash memory, magnetic memory devices and systems, optical memory devices and systems, fixed memory and removable memory. The memory may comprise a database for storing data.

In an embodiment, the apparatus 50 may be or be comprised in a network node, such as in gNB/gNB-CU/gNB-DU of 5G. In an embodiment, the apparatus is or is comprised in the network node 110 or 112. The apparatus may be caused to execute some of the functionalities of the above described processes, such as some of the steps of FIGS. 4A, 6 and 7

In an embodiment, a CU-DU (central unit—distributed unit) architecture is implemented. In such case the apparatus 50 may be comprised in a central unit (e.g. a control unit, an edge cloud server, a server) operatively coupled (e.g. via a wireless or wired network) to a distributed unit (e.g. a remote radio head/node). That is, the central unit (e.g. an edge cloud server) and the radio node may be stand-alone apparatuses communicating with each other via a radio path or via a wired connection. Alternatively, they may be in a same entity communicating via a wired connection, etc. The edge cloud or edge cloud server may serve a plurality of radio nodes or a radio access networks. In an embodiment, at least some of the described processes may be performed by the central unit. In another embodiment, the apparatus may be instead comprised in the distributed unit, and at least some of the described processes may be performed by the distributed unit. In an embodiment, the execution of at least some of the functionalities of the apparatus 50 may be shared between two physically separate devices (DU and CU) forming one operational entity. Therefore, the apparatus may be seen to depict the operational entity comprising one or more physically separate devices for executing at least some of the described processes. In an embodiment, the apparatus controls the execution of the processes, regardless of the location of the apparatus and regardless of where the process-es/functions are carried out.

The apparatus may further comprise communication interface (TRX) 56 comprising hardware and/or software for realizing communication connectivity according to one or more communication protocols. The TRX may provide the apparatus with communication capabilities to one or more UEs or to the core network, for example. The apparatus may also comprise a user interface 58 comprising, for example, at least one keypad, a microphone, a touch display, a display, a speaker, etc. The user interface may be used to control the apparatus by the user.

The control circuitry 52 may comprise a path switch control circuitry 60 for determining when to perform a path switch of e.g. the remote UE, when to reject such path switch, and/or when to instruct the relay UE or the remote UE of patch switch cancellation, according to any of the embodiments. The control circuitry 52 may comprise a handover control circuitry 62 for e.g. determining when to handover UE(s) to another cell, according to any of the embodiments. The control circuitry 52 may comprise a relay UE selection circuitry 64 for selecting relay UE candidate(s) for a particular remote UE or remote UEs.

In an embodiment, an apparatus carrying out at least some of the embodiments described comprises at least one processor and at least one memory including a computer program code, wherein the at least one memory and the computer program code are configured, with the at least one processor, to cause the apparatus to carry out the functionalities according to any one of the embodiments described. According to an aspect, when the at least one processor executes the computer program code, the computer program code causes the apparatus to carry out the functionalities according to any one of the embodiments described. According to another embodiment, the apparatus carrying out at least some of the embodiments comprises the at least one processor and at least one memory including a computer program code, wherein the at least one processor and the computer program code perform at least some of the functionalities according to any one of the embodiments described. Accordingly, the at least one processor, the memory, and the computer program code form processing means for carrying out at least some of the embodiments described. According to yet another embodiment, the apparatus carrying out at least some of the embodiments comprises a circuitry including at least one processor and at least one memory including computer program code. When activated, the circuitry causes the apparatus to perform the at least some of the functionalities according to any one of the embodiments described.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device. In an embodiment, at least some of the processes described may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry.

A term non-transitory, as used herein, is a limitation of the medium itself (i.e. tangible, not a signal) as opposed to a limitation on data storage persistency (e.g. RAM vs. ROM).

As used herein the term "means" is to be construed in singular form, i.e. referring to a single element, or in plural form, i.e. referring to a combination of single elements. Therefore, terminology "means for [performing A, B, C]", is to be interpreted to cover an apparatus in which there is only one means for performing A, B and C, or where there are separate means for performing A, B and C, or partially or fully overlapping means for performing A, B, C. Further, terminology "means for performing A, means for performing B, means for performing C" is to be interpreted to cover an apparatus in which there is only one means for performing A, B and C, or where there are separate means for performing A, B and C, or partially or fully overlapping means for performing A, B, C.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Following is a list of some aspects of the invention.

According to a first aspect, there is provided a method that may be performed by a network node, such as a base station, the method comprising: determining that a remote user equipment (UE) in a cell requires a path switch, the path switch comprising switching the remote UE to connect with the network node via a relay UE; providing, for the remote UE, a connection configuration for connecting with the network node via the relay UE; after providing the connection configuration, determining that the relay UE is to be handed over to another cell; transmitting a message to the relay UE, the message prohibiting the relay UE from establishing a sidelink connection with the remote UE.

Various embodiments of the first aspect may comprise at least one feature from the following bulleted list:

- selecting the relay UE via which the remote UE is to connect with the network node; and including in the connection configuration an indication of the selected relay UE for the remote UE.
- wherein the message is included in a handover command for the relay UE.
- wherein the message indicates the identity of the remote UE for the relay UE.
- receiving, from the relay UE, an acknowledgement for the transmitted message.
- wherein the path switch comprises switching a connection of the remote UE from another indirect connection with the network node to the indirect connection with the network node via the relay UE.
- wherein the network node is or is comprised in a target network node and the remote UE is served by a source network node, the method further comprising: providing a second message for the source network node, the second message indicating that the remote UE should not attempt to establish the sidelink connection with the relay UE.
- wherein the second message further indicates cancellation of the path switch.
- wherein the second message further indicates that a cause of the path switch cancellation is mobility of the relay UE
- including in the second message an indication of another relay UE via which the remote UE can connect to the network node.
- receiving, from the source network node, an acknowledgement for the second message.
- wherein the relay UE is, at the time of determining that the path switch is required, in a second cell provided by the target network node and the remote UE is in the cell provided by the source network node, and the relay UE is to be handed over from the second cell to a third cell.
- wherein the path switch comprises switching a connection of the remote UE from a direct connection with the source network node to the indirect connection with the target network node via the relay UE, or from an indirect connection with the source network node to the indirect connection with the target network node via the relay UE.

According to a second aspect, there is provided a method that may be performed by a user equipment, such as a relay UE, the method comprising: obtaining a message from a network node, the message indicating that another user equipment may attempt to establish a sidelink connection with the user equipment, the message prohibiting the user equipment from establishing the sidelink connection with the other user equipment. The other user equipment may be a remote UE.

Various embodiments of the second aspect may comprise at least one feature from the following bulleted list:

- receiving an indication from the network node that the user equipment is to act as a relay for the other user equipment.
- wherein the user equipment is in a cell provided by the network node, and wherein the user equipment is to be handed over to another cell.
- wherein the message is received in a handover command from the network node.
- receiving a connection establishment attempt from the other user equipment; and rejecting the connection establishment attempt based on the received message.
- informing the other user equipment about a cause of the rejection.

According to a third aspect, there is provided an apparatus, comprising: at least one processor and at least one memory storing instructions that, when executed by the at least one processor, cause the apparatus at least to: determine that a remote user equipment in a cell requires a path switch, the path switch comprising switching the remote user equipment to connect with the apparatus via a relay user equipment; provide, for the remote user equipment, a connection configuration for connecting with the apparatus via the relay user equipment; after providing the connection configuration, determine that the relay user equipment is to be handed over to another cell; transmitting a message to the relay user equipment, the message prohibiting the relay user equipment from establishing a sidelink connection with the remote user equipment.

Various embodiments of the third aspect may comprise at least one feature from the bulleted list under the first aspect.

According to a fourth aspect, there is provided an apparatus, comprising: at least one processor and at least one memory storing instructions that, when executed by the at least one processor, cause the apparatus at least to: obtain a message from a network node, the message indicating that a user equipment may attempt to establish a sidelink connection with the apparatus, the message prohibiting the apparatus from establishing the sidelink connection with the user equipment.

Various embodiments of the fourth aspect may comprise at least one feature from the bulleted list under the second aspect.

According to a fifth aspect, there is provided a computer program product embodied on a distribution medium and comprising program instructions which, when executed by an apparatus, cause the apparatus to carry out the method according to the first aspect.

According to a sixth aspect, there is provided a computer program product embodied on a distribution medium and comprising program instructions which, when executed by an apparatus, cause the apparatus to carry out the method according to the second aspect.

According to a seventh aspect, there is provided a computer program product comprising program instructions which, when executed by an apparatus, cause the apparatus to carry out the method according to the first aspect.

According to an eight aspect, there is provided a computer program product comprising program instructions which, when executed by an apparatus, cause the apparatus to carry out the method according to the second aspect.

According to a ninth aspect, there is provided an apparatus, comprising means for performing the method according to the first aspect, and/or means configured to cause the apparatus to perform the method according to the first aspect.

According to a tenth aspect, there is provided an apparatus, comprising means for performing the method according to the second aspect, and/or means configured to cause the apparatus to perform the method according to the second aspect.

According to an eleventh aspect, there is provided computer implemented system, comprising: a server and at least one radio node; and at least one processor and at least one memory storing instructions that, when executed by the at least one processor, cause the system at least to carry out the method according to the first aspect and/or the method according to the second aspect.

According to a twelfth aspect, there is provided computer implemented system, comprising: one or more processors; at least one data storage, and one or more computer program instructions to be executed by the one or more processors in association with the at least one data storage for carrying out the method according to the first aspect and/or the method according to the second aspect.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

What is claimed is:

1. An apparatus comprising:

at least one processor; and at least one memory storing instructions that, when executed by the at least one processor, cause the apparatus at least to:

determine that a remote user equipment in a cell requires a path switch, based on a measurement report received from the remote user equipment indicating at least one candidate relay user equipment and corresponding sidelink reference signal received power values, the path switch comprising switching the remote user equipment to connect with the apparatus via a relay user equipment;

provide, for the remote user equipment, a connection configuration for connecting with the apparatus via the relay user equipment, wherein the connection configuration is included in a radio resource control (RRC) reconfiguration message and comprises an identifier of the relay user equipment, a PC5 relay channel configuration, and an end-to-end radio bearer mapping configuration;

after providing the connection configuration and based on a mobility-triggered handover decision derived from reference signal received power measurements reported by the relay user equipment while the relay user equipment is in an RRC CONNECTED state, determine that the relay user equipment is to be handed over to another cell;

prior to execution of the handover of the relay user equipment to the another cell, transmit a message to the relay user equipment, the message prohibiting the relay user equipment from establishing a sidelink connection with the remote user equipment, wherein the message comprises an RRC reconfiguration message including an information element identifying the remote user equipment and indicating a prohibition of PC5 link establishment with the remote user equipment;

receive, from the relay user equipment, an acknowledgment message confirming the prohibition; and transmit, to a source network node serving the remote user equipment, a handover cancel message indicating cancellation of the path switch due to mobility of the relay user equipment causing the relay user equipment to reject a PC5 connection establishment request from the remote user equipment and to indicate a cause of rejection associated with the mobility of the relay user equipment.

2. The apparatus of claim 1, wherein the message is included in a handover command for the relay user equipment.

3. The apparatus of claim 2, wherein the path switch comprises switching a connection of the remote user equipment from another indirect connection with the apparatus to the indirect connection with the apparatus via the relay user equipment.

4. The apparatus of claim 3, wherein the relay user equipment is, at the time of determining that the path switch is required, in a second cell provided by the target network node and the remote user equipment is in the cell provided by the source network node, and the relay user equipment is to be handed over from the second cell to a third cell.

5. The apparatus of claim 4, wherein the path switch comprises switching a connection of the remote user equipment from a direct connection with the source network node to the indirect connection with the target network node via the relay user equipment, or from an indirect connection with the source network node to the indirect connection with the target network node via the relay user equipment.

6. The apparatus of claim 5, wherein the message prohibiting the sidelink connection comprises a sl-RemoteUEToProhibitList information element including a list of one or more remote user equipment identifiers for which sidelink connection establishment is prohibited.

7. The apparatus of claim 6, wherein the relay user equipment is configured, in response to the message, to transmit a sidelink notification message to the remote user equipment indicating a path switch cancellation prior to rejecting a connection establishment request.

8. The apparatus of claim 7, wherein the connection configuration further comprises security context information associated with a target cell, and wherein the prohibition prevents delivery of an RRC reconfiguration complete message associated with the target cell to a different cell.

9. The apparatus of claim 8, wherein the determination that the relay user equipment is to be handed over comprises detecting that the relay user equipment is moving toward a cell edge based on a comparison of reference signal measurements of a serving cell and a neighboring cell exceeding a threshold condition.

10. The apparatus of claim 9, wherein the relay user equipment is configured, upon rejecting the sidelink connection establishment, to trigger release or avoidance of forwarding user plane or control plane data associated with the remote user equipment over a PC5 interface.

* * * * *